(12) United States Patent
Murray et al.

(10) Patent No.: US 6,217,437 B1
(45) Date of Patent: Apr. 17, 2001

(54) DOUBLE-SIDED WORK STATION

(75) Inventors: Dale Murray, Elkton, MD (US); Thomas Darby, Dallas, TX (US); Eric Dietrich, Woodbine, MD (US)

(73) Assignee: Lab Products, Inc., Seaford, DE (US)

( * ) Notice: Subject to any disclaimer, the term of this patent is extended or adjusted under 35 U.S.C. 154(b) by 0 days.

(21) Appl. No.: 09/435,185

(22) Filed: Nov. 5, 1999

(51) Int. Cl.[7] .................................................. A01K 1/00
(52) U.S. Cl. ........................ 454/57; 119/419; 119/452; 119/473; 119/500; 454/187
(58) Field of Search ............................. 454/49, 57, 187, 454/230, 232, 233; 119/418, 419, 452, 472, 473, 500; 55/385.2, 467, 473

(56) References Cited

U.S. PATENT DOCUMENTS 3,557,756 * 1/1971 Ramsey .
3,630,174 * 12/1971 Runkle et al. .................... 454/230 X
3,924,571 * 12/1975 Holman .
3,944,405 * 3/1976 Van Calsteren et al. .......... 55/473 X
4,623,367 * 11/1986 Paulson ............................. 454/230 X

FOREIGN PATENT DOCUMENTS

1179551 * 1/1970 (GB) .................................... 119/419

* cited by examiner

Primary Examiner—Harold Joyce
(74) Attorney, Agent, or Firm—Stroock & Stroock & Lavan LLP

(57) ABSTRACT

A work station includes a pressure cabinet and a work surface forming the top of the pressure cabinet. The work surface is perforated along at least a portion of the work surface. A pressure inducing assembly is located within the cabinet below the work surface to draw air into the cabinet. A plenum is coupled to the pressure cabinet. An air chamber is mounted on the plenum and receives air passing from the cabinet through the air plenum to the air chamber. The air chamber then guides the air towards the work surface.

8 Claims, 4 Drawing Sheets

DOUBLE-SIDED WORK STATION

BACKGROUND OF THE INVENTION

This invention is directed to a work station at which laboratory animals can be moved from one cage to another, and in particular, a work station which protects the animals within the cage from contamination while being worked on.

Laminer flow work stations are known in the art from Lab Products model number Stay-Clean 30909B and 30910B. These work stations include a table surface. An enclosed three sided hood extends above the work surface in effect creating a housing about the work surface with one open side to provide access and viewability to the work surface. At least a portion of the work surface is perforated to allow air to flow there through. Flow blowers are disposed beneath the surface to cause a negative pressure at the table surface perforations to draw air from the work surface, and front exterior area, in through the work surface to filter the air. In this way, any impurities at the work station which are airborne and likely to contaminate worker and animals at the work station are prevented from reaching the worker or animals.

This work station has been satisfactory. However, the requirement for the large three sided containment hood makes the work station bulky, heavy, and limits access to the work station. Only one or two workers working at the open side of the hood can access the work station. Accordingly, a work station which overcomes these deficiencies is desired.

SUMMARY OF THE INVENTION

A work station has a base. A work surface is supported on the base. The work surface is perforated along at least the periphery thereof. At least a first plenum extends from the base to support a top cabinet to be disposed above and at least coextensive with the work surface. The top cabinet has a lower surface facing the work surface, the lower surface being perforated at least along the periphery. Negative pressure blowers are disposed between the work surface and the air plenum to draw air through the work surface and cause it to pass through the plenum(s) and through the top cabinet to be expelled or forced back onto the work surface below.

In a preferred environment, a filter is disposed between the work surface and the lower surface of the cabinet to filter the air drawn by the negative pressure blowers. A removable divider is disposed along the work surface to separate one portion of the work surface from the other to prevent cross contamination between a first portion of the work surface and a second portion of the work surface. A crank handle is affixed to the base and operatively coupled to the work surface to adjust the height of the work surface.

Accordingly, it is an object of the invention to provide an improved work station.

Still, another object of the invention is to provide a work station lighter in weight with increased stability.

A further object of the invention is to provide a work station which provides protection to the room in which the work station is utilized as well as to the users of the work station while allowing more access to the work station by the user.

Still another object of the invention is to provide a work station which allows simultaneous working on a greater number of cages without increasing the overall size of the work bench.

Yet another object of the invention is to utilize recycled air to provide protection from cross contamination over a greater area.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
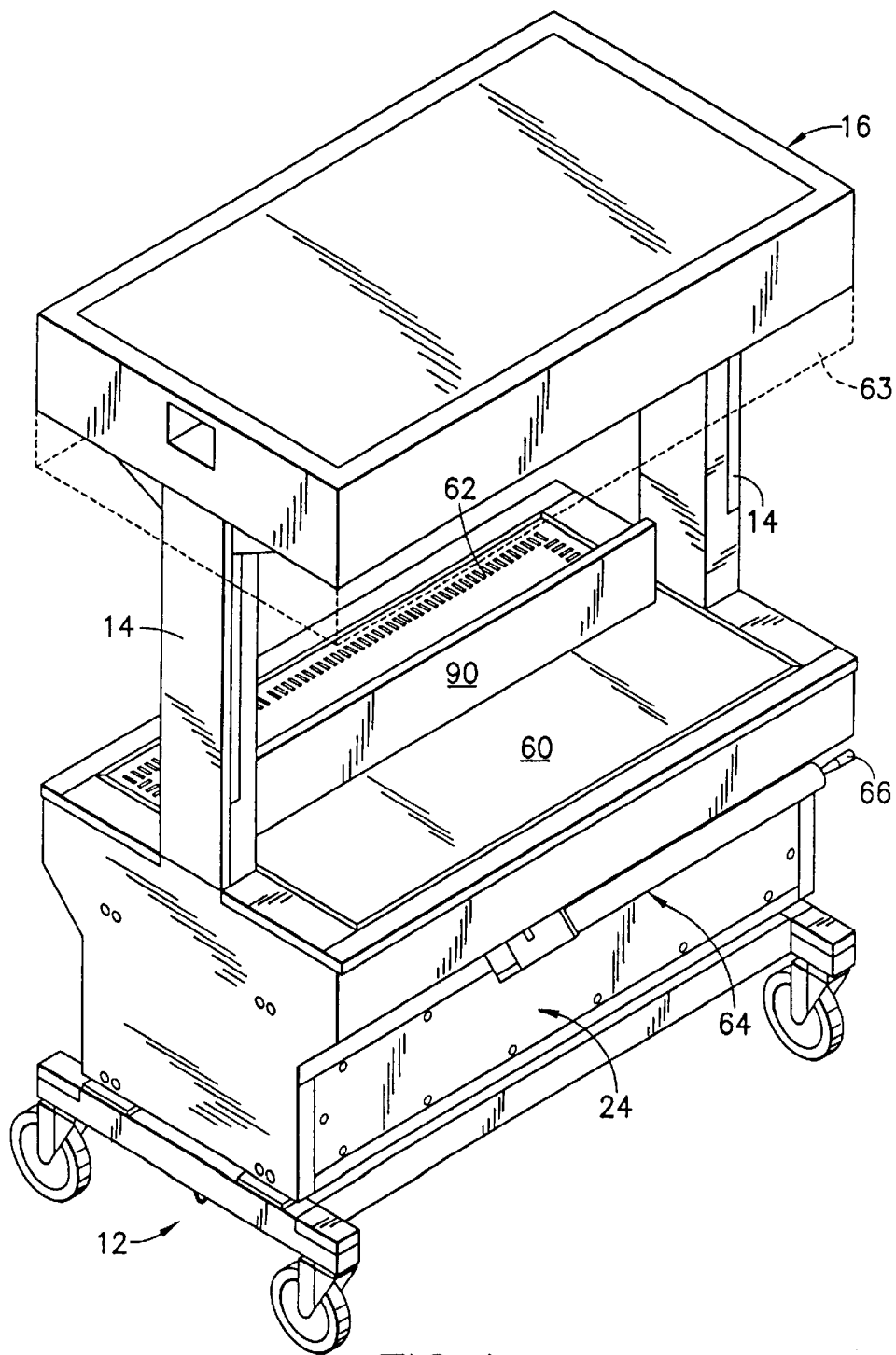
FIG. 1 is a rear perspective view of a work bench constructed in accordance with the invention.
Figure 2:
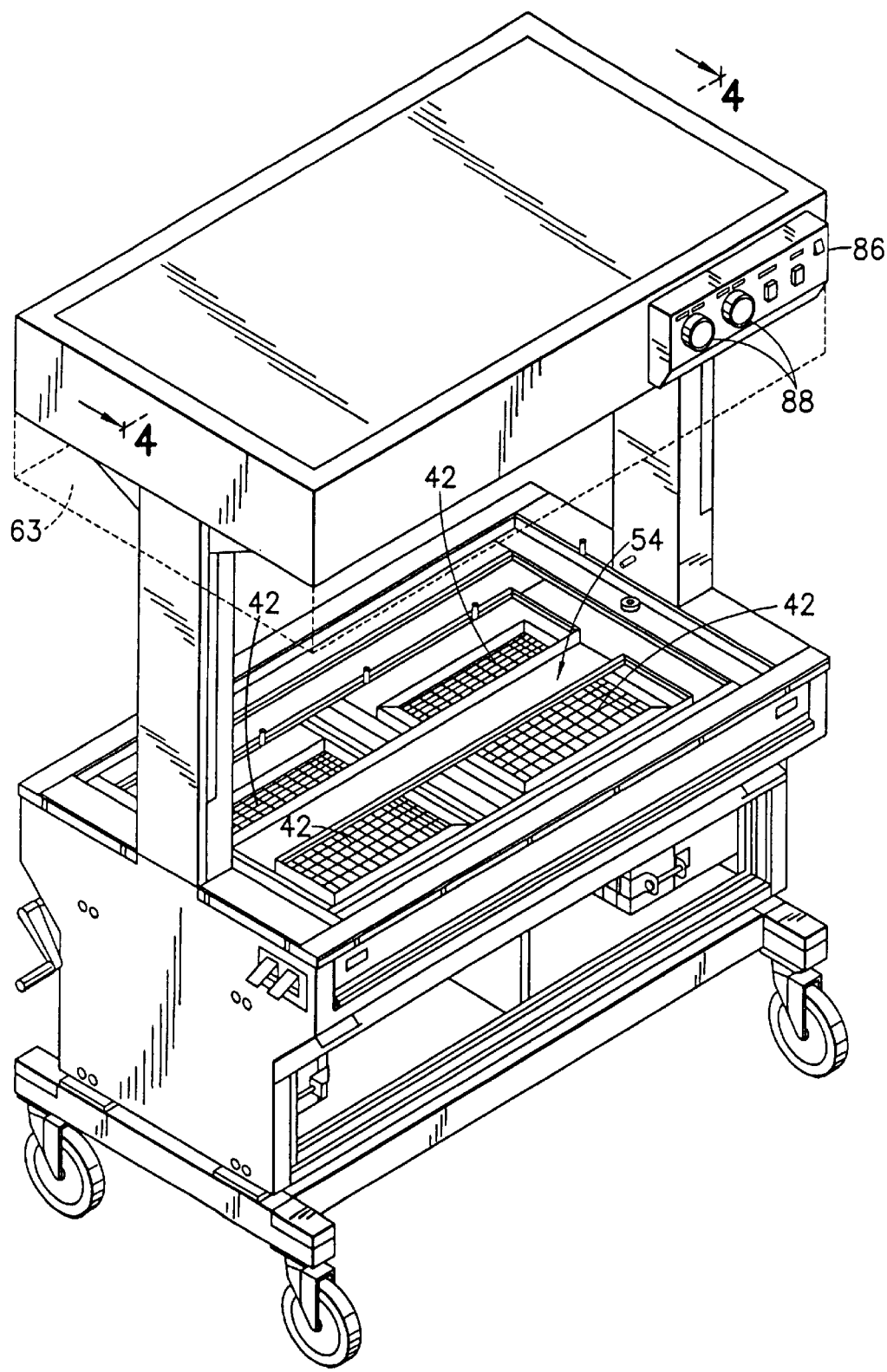
FIG. 2 is a front perspective view of the work bench constructed in accordance with the invention without showing the work surface, prefilter, access panel and divider.

The work station, generally indicated as 10, includes a base 12, a plenum support 14 disposed on each side of base 12, and a top cabinet, generally indicated as 16 supported by plenums 14. Base 12 includes wheel assembly 18. A pressure cabinet 22 for return air is mounted on wheel assembly 18 within base 12 so that the entire base 12 and, in effect work station 10, can be easily transported from one position to another as the work to be performed at work station 10 requires.

Figure 4:
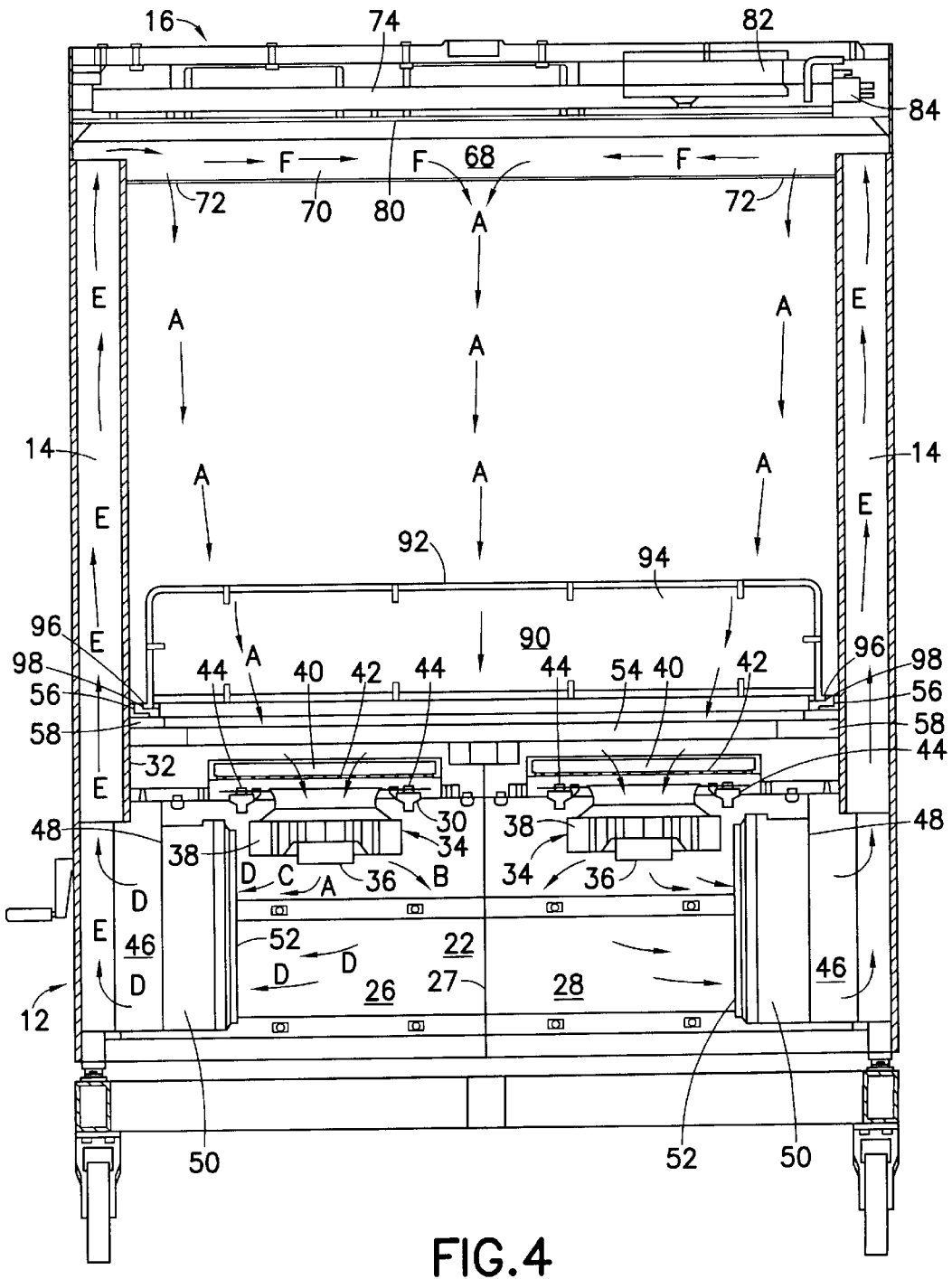
FIG. 4 is a sectional view taken along line 1—1 of FIG. 2.

As shown in FIG. 4, pressure cabinet 22 has a substantially hollow interior. Cabinet 22 includes a removable access plate 24 for providing access to the interior of pressure cabinet 22 for repair and maintenance and closing cabinet 22 during use. A center cabinet partition 27 extends within pressure cabinet 22 to separate the cabinets into first and second chambers 26, 28. The construction of chambers 26 and 28 is substantially identical and therefore, like numbers are utilized for describing each chamber and the description of chamber 26 is identical to that of chamber 28 and therefore will not be repeated. A first support 30 is mounted between center cabinet partition 26 and a side wall 32 of plenum 14 extending into pressure cabinet 22. A motorized blower assembly 34 is mounted on support 30 and provides a negative pressure to draw air through the blower into chamber 28. Blower assembly 34 includes a motor 36 for driving a fan 38. A pre filter 40 is mounted upstream of fan 38 to prefilter air being drawn into the motorized blower 34. A grill 42 is disposed between filter 40 and fan 38 to protect the operator from the fan blades when changing filter. Motorized blower 34 is mounted to support 30 by vibration isolator motor mounts 44. A communication cabinet 46 communicates with air plenum 14. Air communication cabinet 46 has an opening 48 into respective cabinets 26, 28. A HEPA filter 50 is disposed at opening 48 to filter the air prior to its passage into plenum 14. A grill 52 is mounted between HEPA filter 50 and the remainder of cabinet 26 to protect the filter 48 from any large objects or service technicians which may damage the filter.

A first flange 56 is mounted around base 12 near the top of the base 12 and extends partially into pressure cabinet 20.

A second flange 58 extends from flange 56. A pan 54 is held within pressure cabinet 20 by flange 58. Work surface 60 is held by flange 56 to be disposed to form a top surface of base 12. Surface 60 is formed with a plurality of air intake slots or perforations 62, which although not shown for clarity, extend at least all the way about the perimeter of surface 60. In another embodiment, it is contemplated that the perforations could extend across the entire surface of the top of surface 60 which may actually result in reduced weight of the overall work bench and improved air capture. However, for reasons which will be discussed below, it is essential that perforations extend along at least half the periphery. Although, in an exemplary embodiment, no air protection need be provided on one half of surface 60 so that an embodiment as shown in FIG. 1 may be acceptable. Because of perforations 62, an air path is defined as shown by arrows A, B, C, D, E so that air travels a path down through the perforation 62 of surface 60 through air filter 40, through blower assembly 34, through HEPA filter 50 and communicating through plenum 14 into chamber 68.

Figure 3:
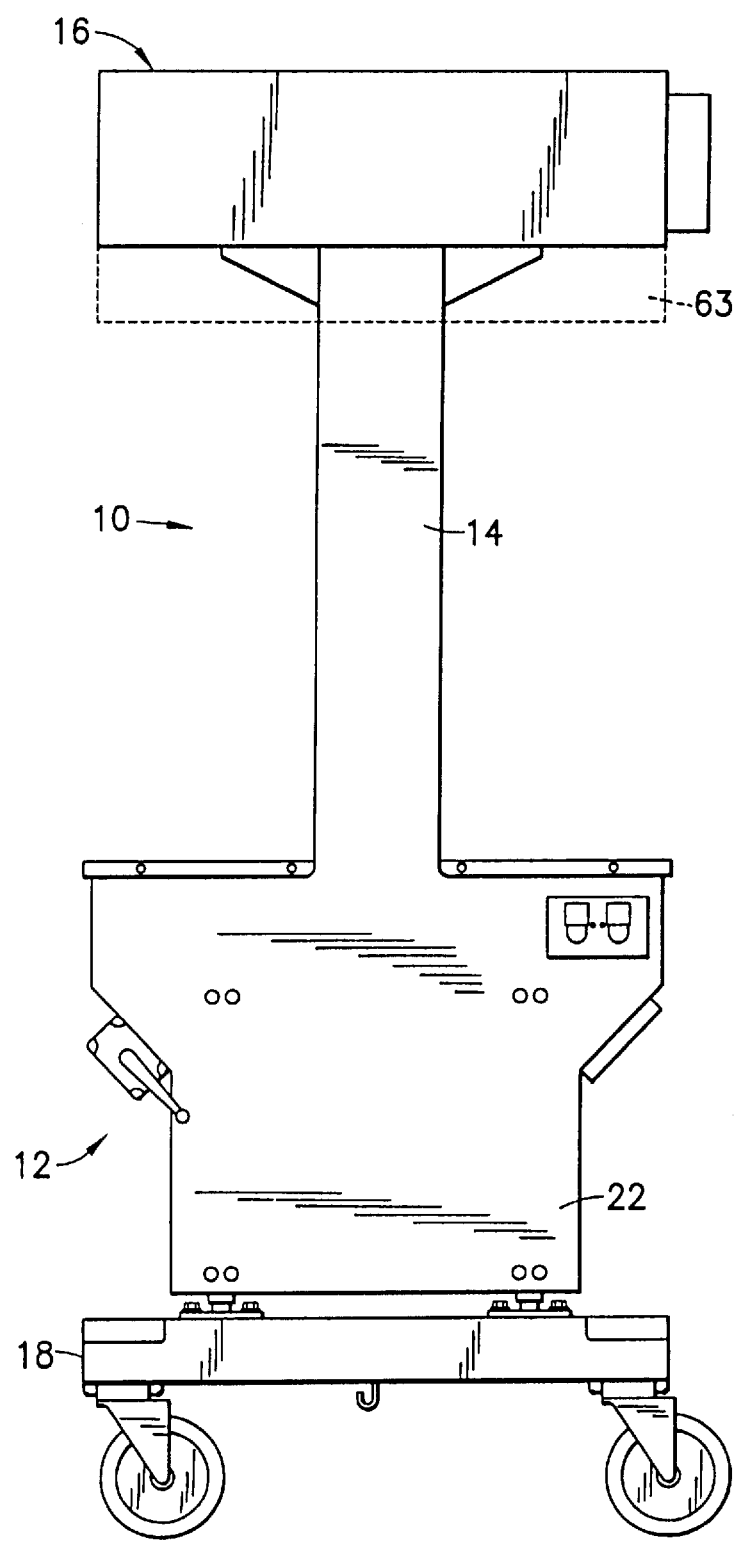
FIG. 3 is a side elevational view of the work bench constructed in accordance with the invention.

The crank mechanism generally indicated as 60, is shown in FIGS. 1 and 3. Crank mechanism 60 adjusts the height of surface 60 relative to base 20. A handle 66 in one embodiment turns a crank in crank assembly 64 which is coupled to flanges 56 for raising the height of the work surface 60 to facilitate work by different sized workers.

Top cabinet 16 is supported directly above surface 60 by plenums 14. Top cabinet 20 is at least coextensive with surface 60. Top cabinet 16 includes an air chamber 68 which communicates with plenums 14 and has a perforated lower surface 70. Perforations 72 in lower surface 70 allow air to pass in a uniform pattern through air chamber 68 in the general direction of Arrows F and A. This results in recirculating of air between an input at surface 60 and an output at lower surface 70 of air chamber 68. By placing perforations 72 at least at the periphery of surface 70 so as to correspond with perforations in 62 at the work surface 60, a curtain of filtered air is provided to separate the work space of work station 10 from the ambient environment and also capturing a percent of ambient air.

Top cabinet 16 also supports therein a fluorescent light source 74. The top of pressure air chamber 68 is a translucent panel 80 so the light can shine through into chamber 68 and through the translucent perforated air diffuser ceiling 70. This way the work surface can be illuminated. A power cord 82 is mounted within top cabinet 16 to eliminate cord at floor area and is coupled to light source 74, motors 36, and in an automated embodiment, to crank assembly 64 and provides power thereto. A retractable plug 84 coupled to power cord reel 82 is coupled to a wall power source. A control panel 86 is mounted to top cabinet 16 and controls the speed of blower unit assemblies 34 and in turn the amount of pressure provided in pressure cabinet 20 and air chamber 68, monitoring HEPA filter, the turning On and Off of the light as well as the turning on and off of power through buttons and switches 88 mounted on control panel 86. A laminate shroud 63 may also extend about top cabinet 20 to better confine and guide the curtain of air.

As can be seen, because the top is supported at the sides by plenums 14, the work station is an open work station to which access can be provided from both the front and back. Therefore, at least two workers can work on separate cages, both on the same side or opposite each other. In order to prevent cross contamination of the animals within the cages between workers, a divider 90 is provided. Divider 90 is substantially a screen having a frame 92 and a body portion 94 supported therein. Frame 92 includes pegs 96 which are received by holes 98 in surface 60 to allow easy removal of screen 60.

Pan 54 is provided to further protect blower assemblies 34 from spillage of cleaning agents and collect any dirt which may pass through perforated opening 62 which are not air borne.

During use the work bench 10 is wheeled into position near a ventilated rack having the cages contained thereon to be worked on at work bench 10. Work bench 10 is connected to a power supply by plugging power cord 84 into the building power source. The blower assemblies 34 or motorized fans are then turned on by use of a control switch from control panel 86. This creates a negative pressure at work surface 60 and causes air to be drawn through each of cabinets 26, 28. As air passes through perforations 62 surface 60 the air is filtered through prefilter 40 and then filtered again through HEPA filter 50 as it passes up plenum 14 into air chamber 68. The air creates a positive pressure in air chamber 68. The air then moves through perforations 72 of air chamber 68 down towards surface 60. This in effect provides a pressurized air curtain about the working surface. A first technician will remove a cage from the rack and place it on the surface 60. The worker is now isolated from the cage by the air curtain. Additionally, the cage is now isolated from the ambient environment outside of the work bench and outside of the rack by the air curtain.

The cage may now be opened without fear of cross contamination of the animals within the cage. Furthermore, a second technician may take a cage and place a cage on a second portion of surface 60 on the other side of barrier 90 and open the cage without fear of cross contamination with the first technician's cage. After operation or exchange of animals to a clean cage, the cage would then be returned to the rack.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A double-sided work station having an open front side and an open back side, said work station comprising:

a pressure cabinet;

a work surface disposed on and forming a top to the pressure cabinet and being accessible by a worker from either one of the front side or the back side of the work station;

the work surface having perforations along at least a portion thereof;

a pressure inducing assembly located within the pressure cabinet for moving air through the perforations;

a first air plenum coupled to said pressure cabinet providing a channel through which air may be caused to move;

an air chamber mounted on said first air plenum and coupled thereto for receiving air from said first air plenum and guiding said received air toward said work surface.

2. The work station of claim 1, further comprising a filter disposed between said pressure inducing assembly and plenum.

3. The work station of claim 1, further comprising a divider extending across a length of said surface to divide the work surface into a first portion and second portion, the first portion being isolated from the second portion.

4. The work station of claim 1, further comprising a second air plenum coupled to said pressure cabinet providing a channel through which air may be caused to move.

5. The work station of claim 1, further comprising:

a second air plenum coupled to said pressure cabinet providing a channel through which air may be caused to move; and a center cabinet partition disposed within said pressure cabinet for separating said pressure cabinet into a first pressure cabinet and a second pressure cabinet;

a first pressure inducing assembly being disposed in said first cabinet and a second pressure inducing assembly being disposed in the second pressure cabinet, said first pressure cabinet communicating with said first plenum and said second pressure cabinet communicating with said second plenum.

6. The work station of claim 1, wherein said perforations are formed about the periphery of the work station surface.

7. The work station of claim 5, further comprising a second filter disposed between said second pressure member and said second plenum.

8. The work station of claim 3, wherein said divider is removable.

* * * * *